United States Patent [19]

Koebernik

[11] Patent Number: 5,242,072
[45] Date of Patent: Sep. 7, 1993

[54] VENTED FUEL TANK CAP

[75] Inventor: Ronald E. Koebernik, Cedarburg, Wis.

[73] Assignee: The Kelch Corporation, Mequon, Wis.

[21] Appl. No.: 10,927

[22] Filed: Jan. 29, 1993

[51] Int. Cl.⁵ .............................................. B65D 51/16
[52] U.S. Cl. .................................... 220/202; 220/203; 220/DIG. 33; 137/43
[58] Field of Search .............................. 220/202-204, 220/DIG. 33, 303; 137/43

[56] References Cited

U.S. PATENT DOCUMENTS

| | | |
|---|---|---|
| 1,363,263 | 12/1920 | Ohliger . |
| 2,258,019 | 10/1941 | Kramer . |
| 3,389,715 | 6/1968 | Hebard . |
| 3,757,987 | 9/1973 | Marshall . |
| 3,918,606 | 11/1975 | Keller . |
| 4,685,584 | 8/1987 | Harris . |

FOREIGN PATENT DOCUMENTS 893280  4/1962  United Kingdom .................. 137/43

*Primary Examiner*—Allan N. Shoap
*Assistant Examiner*—Paul A. Schwarz
*Attorney, Agent, or Firm*—Quarles & Brady

[57] ABSTRACT

A cap for a fill pipe of a fluid container, such as a gas tank, is provided. It has a vent hole which is normally held unsealed by the weight of a ball which impinges against and thereby tilts a spring loaded pin carrying an O-ring. When the cap tips away from the vertical by more than a pre-selected angle, the ball rolls away from the pin and the spring urges the pin to an orientation where the O-ring seals the hole. When the container is tipped beyond the pre-selected angle, should the internal tank pressure exceed a pre-determined level, the pressure overcomes the force of the spring allowing relief venting.

5 Claims, 4 Drawing Sheets

VENTED FUEL TANK CAP

BACKGROUND OF THE INVENTION

1. Field Of The Invention

This invention relates to normally vented caps for fluid containers such as fuel tanks. The invention allows venting in both vacuum and pressure conditions during normal operation. When the tank is tipped or inverted, the venting system closes itself and restricts leaking of fluid unless the internal tank pressure builds to an undesirable level.

2. Description Of The Art

The fuel delivery systems of many internal combustion engines require the absence of vacuum or pressure. This is sometimes achieved by venting the fuel tank through a tortuous path in a cap to the outside atmosphere. However, these caps may allow fluid to spill from the tank when the system is tipped or inverted.

It is desirable to provide an improved cap of this type which is easy to manufacture, compact, and which provides improved handling of fluids when the tank is tipped. Most importantly, there is a need for a cap of this type which closes when tipped but can vent again even when tipped if internal vapor pressure threatens to reach a level which jeopardizes the integrity of the tank or the cap. This could occur, for example, if an overturned lawn mower were exposed to a heat source such as a muffler or direct sunlight. In this situation, it would be preferable to allow intermittent and brief venting in order to maintain the integrity of the tank and the cap, and to prevent excess vapor pressure discharge.

SUMMARY OF THE INVENTION

The invention provides a ventable cover for a fluid container opening. The cover includes a cap having a lateral barrier wall with a substantially longitudinal vent bore in it. A tiltable pin assembly, which extends through the bore, has an inboard portion extending below the barrier wall and an outboard portion extending above the barrier wall. (As used herein, "above" refers to the space extending from the barrier wall outward, and "below" refers to the space extending from the barrier wall in the opposite direction.) There is a ball positioned to roll in the cap above the barrier wall so as to impinge against the pin assembly outboard portion when the cap is not abnormally tipped.

Bias means located below the barrier resists deflection of the pin assembly by the ball and provides a resilient downward bias on the pin assembly. Also provided is a seal driven by the outboard portion of the pin assembly. The seal can seal the bore when the ball is not impinging against the pin assembly and can allow fluid (e.g., gas fumes) to flow through the bore when the ball impinges against the pin assembly. In addition, the seal may open under excess pressure conditions in the tank when the ball is not impinging against the pin assembly.

In a preferred aspect, the cap encapsulates a metal baffle with a hole. A flat disk with a stud receives an O-ring and then extends through the hole, and is received by clip which also retains a spring. A metal ball is positioned to roll on the disk in the normal operating condition. The weight of the ball can deflect the disk, unseating the O-ring to allow venting. When inverted, the ball rolls off the disk and spring tension closes off the vent orifice. Internal tank pressure can overcome the spring tension to allow venting before the integrity of the tank is threatened.

It is an object of the invention to provide a simple, easy to manufacture, economical and compact venting cap of the above type which seals itself upon abnormal tipping.

It is a further object to provide such a gas cap which then unseals itself even in a tipped condition whenever internal tank pressure threatens to jeopardize the integrity of the tank or the cap.

These and still other objects and advantages of the invention will be apparent from the description which follows. The preferred embodiments will be described with reference to the accompanying drawings. However, these embodiments do not represent the full scope of the invention. Rather, the invention may be employed in other embodiments. Reference should therefore be made to the claims for interpreting the breadth of the invention.

DESCRIPTION OF THE PREFERRED EMBODIMENTS

Figure 1:
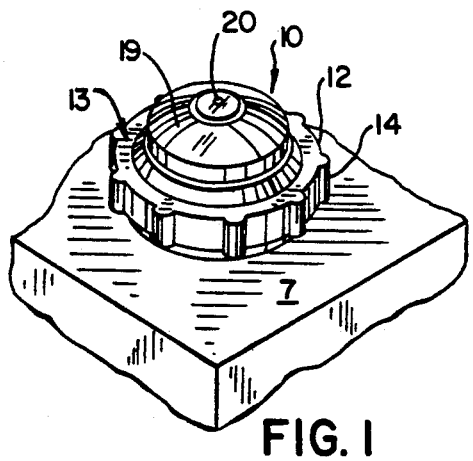
FIG. 1 is a view of a cap embodying the present invention, as mounted on a fuel tank.
Figure 2:
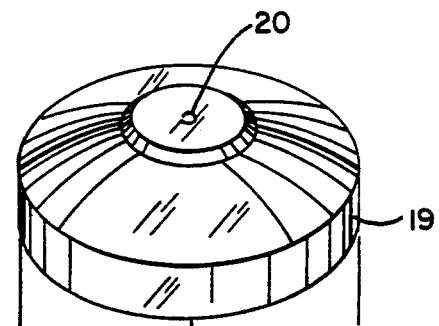
FIG. 2 is an exploded perspective view showing the components of that embodiment.
Figure 2:
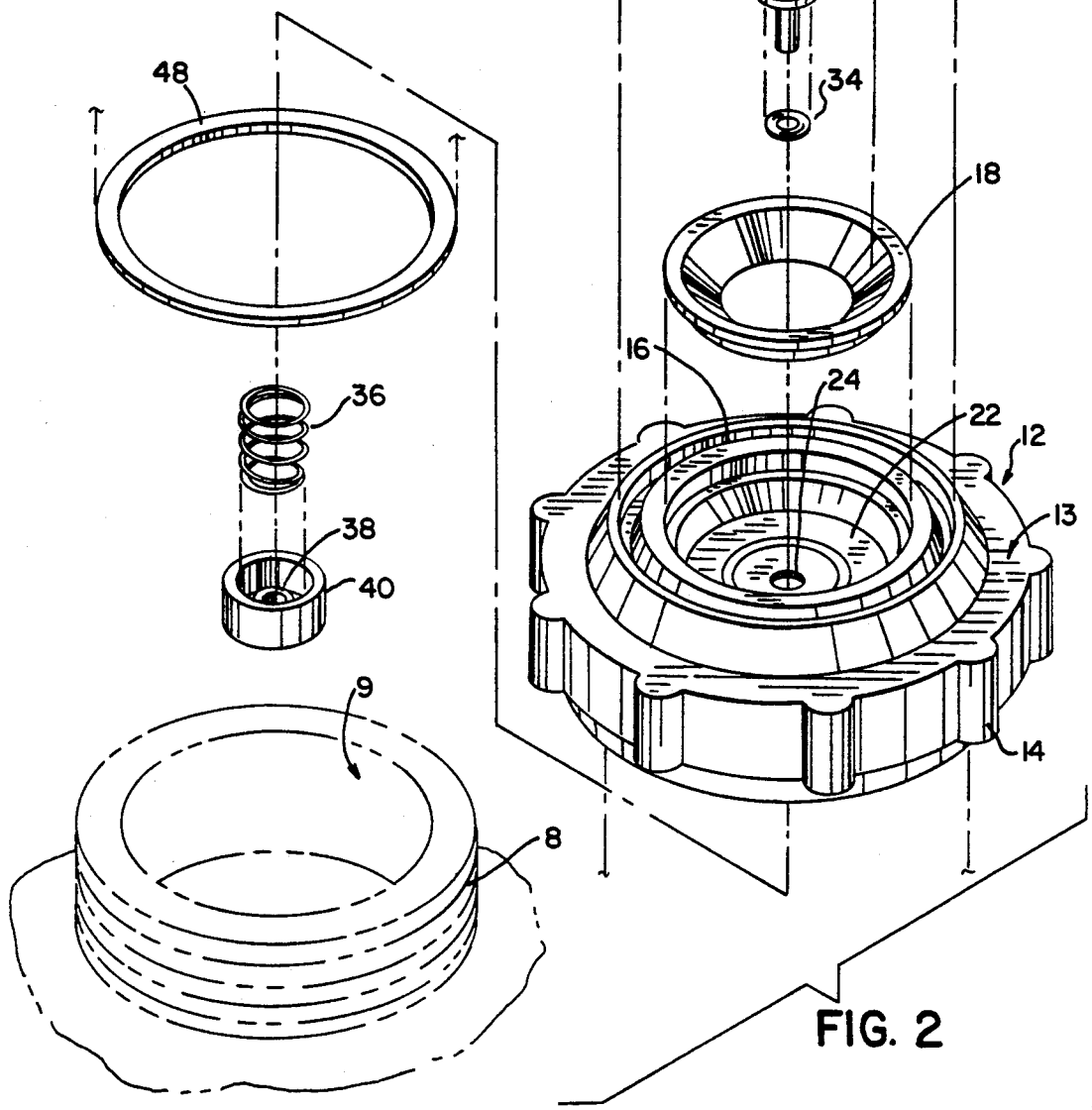
Figure 3:
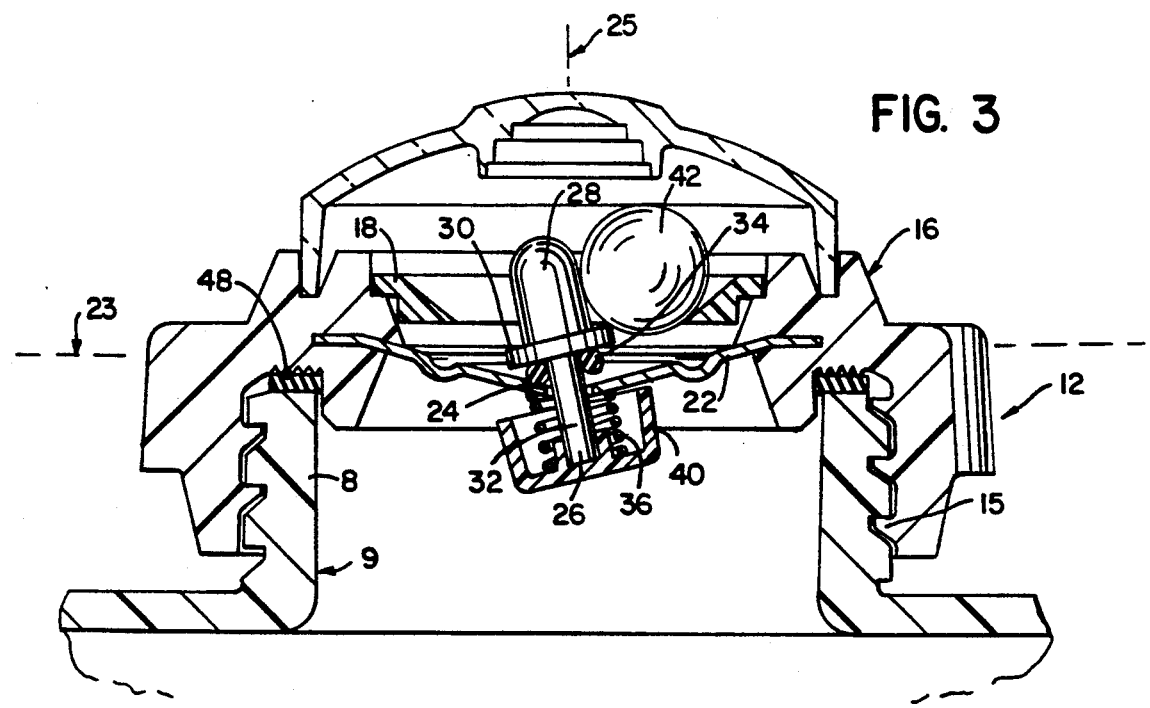
FIG. 3 is a cross sectional view of an assembled, installed cap showing the ball tilting the pin (and thereby allowing the cap to vent)

As best seen in FIGS. 1-3, the first embodiment, a cap 10 embodying the present invention is installed on a fuel tank 7 which has threads 8 around opening 9. The cap includes a circular plastic body 12 having a circumferential wall 13 with external gripping ridges 14 and internal threads 15. Body 12 has a terraced superstructure 16 on which may be mounted (in the FIG. 1-3 embodiment) a circular, banked ball track 18 and over it a circular cover 19 having a vent hole 20.

Encapsulated across the opening of the underside of superstructure 16 is a fluid barrier wall 22 which is generally parallel to the lateral plane 23 of the cap 10. The barrier wall 22 has a central bore 24 which opens along a longitudinal axis 25 which is substantially perpendicular to lateral plane 23. As best seen in FIG. 3, a pin 26, which has a stubby outboard portion 28 and a central shoulder 30, also has a slender inboard portion 32 which is inserted through an O-ring seal 34, bore 24, and a helical spring 36. The pin is also friction fit into sleeve 38 of a spring guide 40.

Spring 36 urges shoulder 30 to hold O-ring 34 tightly against fluid barrier 22, thereby sealing bore 24, and also tries to maintain pin 26 perpendicular to the longitudinal axis 25 of cap 10. Ball 42 rolls on track 18, and when cap 10 is not abnormally tipped, impinges against outboard portion 28 of pin 26, thereby deflecting pin 26 and O-ring 34. This unseals hole 24. The lower end of the pin 32 is welded into retainer 40 (in recess 38).

Cap 10 can be fastened to the fuel tank by means of threads 15 on body 12 and threads 8 on the tank 7. Rubber gasket 48, which is affixed to the underside of superstructure 16, provides a fluid seal.

Figure 4:
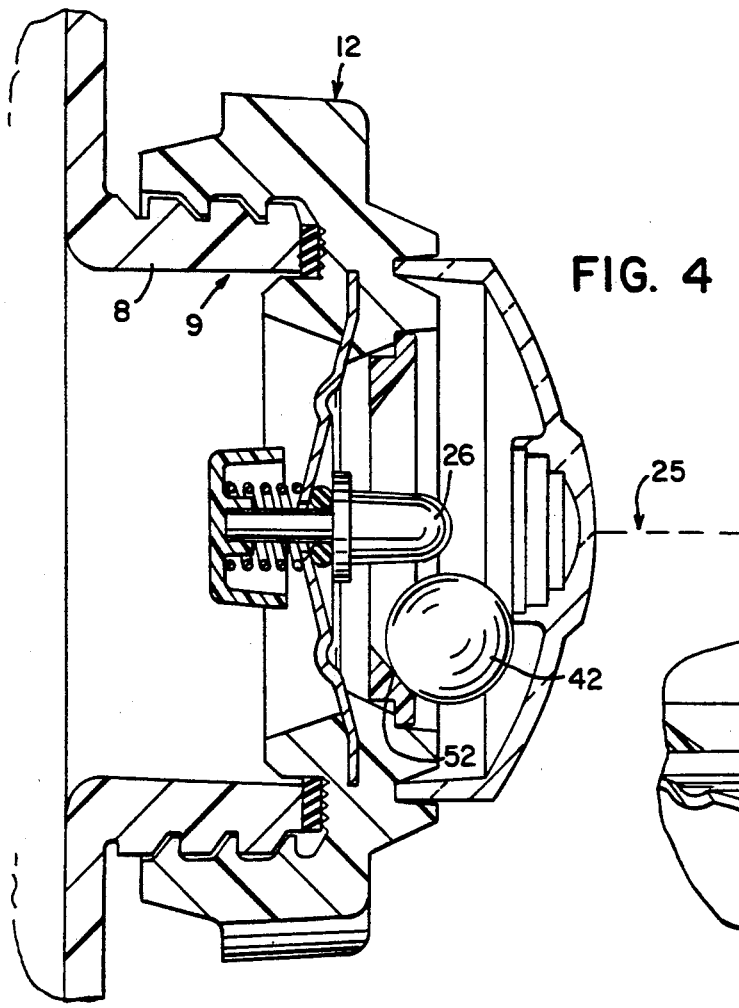
FIG. 4 is a side sectional view, showing the cap tipped.
Figure 5:
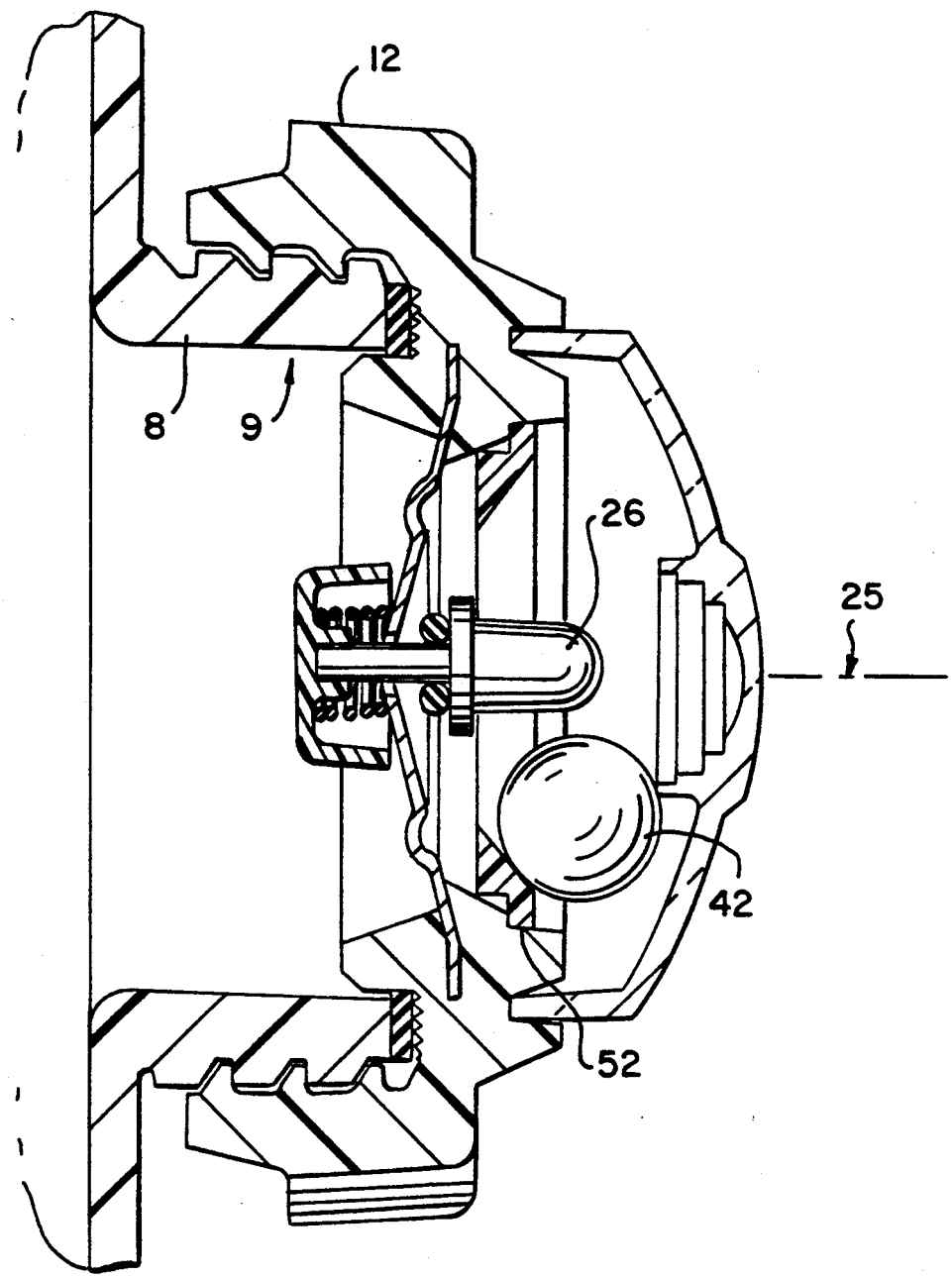
FIG. 5 is similar to FIG. 4, except that internal pressure has nevertheless forced the pin outward to allow venting.

FIGS. 3, 4 and 5 illustrate the operation of the present invention. In FIG. 3, the longitudinal axis 25 of the cap 10 is vertical. The banked rolling surface 52 of track 18 causes ball 42 to impinge against outboard portion 28 of pin 26. The resultant deflection of pin 26 lifts a portion of O-ring 34 off of fluid barrier 22, thereby opening a passage for fluid flow between inboard portion 32 of pin 26 and the periphery of bore 24. In this orientation of longitudinal axis 25, spring 36 is unable to hold pin 26 parallel to longitudinal axis 44.

In FIG. 4, longitudinal axis 25 of the cap 10 has been offset from vertical by more than a pre-selected angle (the cap is abnormally tipped). Accordingly, ball 42 has rolled to the outer edge of rolling surface 52 of track 18 and no longer impinges against pin 26. As a result, spring is able to hold pin straight, such that shoulder 30 now retains O-ring 34 against fluid barrier 22. This has the effect of sealing bore 24. It should be recognized that there are orientations of longitudinal axis 25 in which the ball 42 continues to impinge against pin 26 but with insufficient force to overcome the force of spring 36 so that O-ring 34 continues to seal bore 24.

FIG. 5 is like FIG. 4, except that internal tank pressure has exceeded a pre-selected level. That pressure is extended against pin shoulder 30 and has moved pin collar 30 and thus O-ring 34 away from fluid barrier 22, thereby opening a fluid passageway between inboard portion 32 of pin 26 and the periphery of bore 24. This state continues until the internal pressure recedes below the pre-selected level, at which time spring 36 is able to cause shoulder 30 to compress O-ring 34 against fluid barrier 22 and re-seal bore 24.

Body 12 is preferably made of plastic by an injection molding process in which fluid barrier 22 is integrally molded within body 12. Other materials and manufacturing methods may be used as well.

Pin 26 is preferably made of acetal. However, other materials, such as nylon, may also be used. Its outboard portion 28 is designed in coordination with the size of ball 42 so that ball 42 will tilt pin 26 sufficiently to raise one side of O-ring 34 off of fluid barrier 22 when the longitudinal axis 25 of the cap is offset from vertical by a pre-selected angle or less.

Lower portion 32 of pin 26 is sized to allow a gap between it and the periphery of bore 24.

Figure 6:
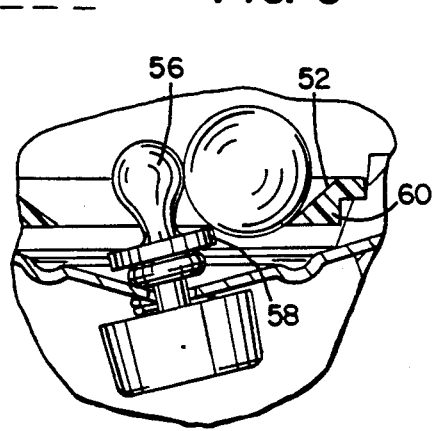
FIG. 6 is an enlarged partial sectional view showing a second embodiment of the pin.

FIG. 6 shows a second embodiment of pin 26. It is designed to allow ball 42 to contact the pin both on its upper portion 56 and on its collar 58. This double contact lessens the stress on pin 54 and thereby enhances its longevity.

Ball track 60 is sized and shaped to have a friction fit in superstructure 16 of body 12. Its rolling surface 52 is linearly banked for ease of manufacture, although a curved bank could also be used. Track 18 is preferably made from nylon.

Ball 42 is a sphere made of stainless steel, although brass, glass or other materials may also be used.

Figure 7:
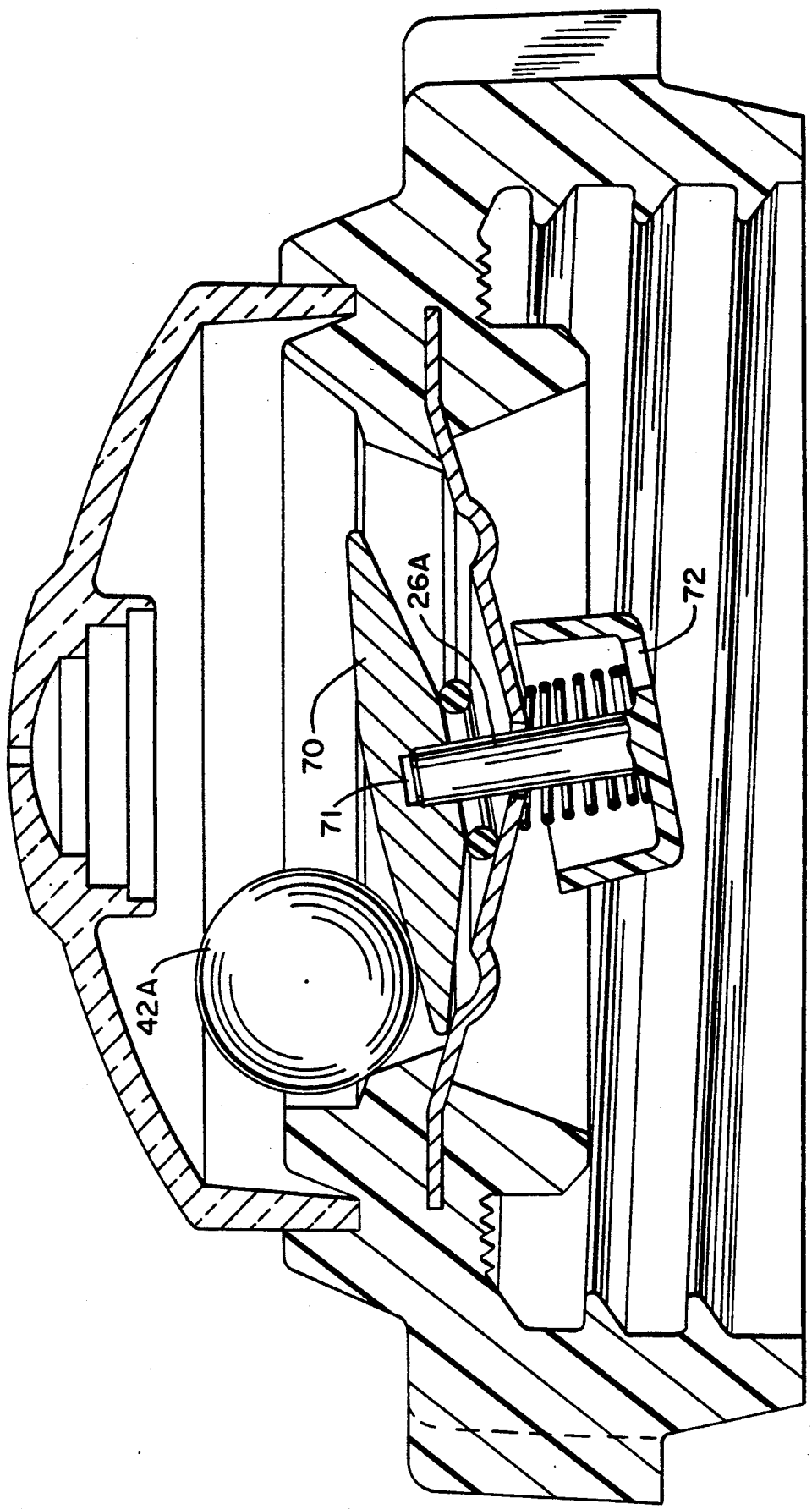
FIG. 7 is a view similar to FIG. 4, albeit of the most preferred form of the invention.

As shown in the embodiment of FIG. 7, a third construction can be provided. The primary differences are that in FIG. 7 there is a "pin assembly" disk 70 with a lower recess 71 to receive, via a welded connection, pin 26A. As the ball rolls on the top of disk pin 26A tilts. An additional vent hole 72 can also be provided. In this version, track 18 is not needed.

Although the preferred embodiments of the invention have been described above, the invention claimed is not so restricted. There may be various other modifications and changes to these embodiments which are within the scope of the invention. For example, the track for the ball could be a non-circular ramp on which the ball can roll up or down, but not around the pin. In addition, the helical spring could be replaced by torsional, flexional or other bias means.

Moreover, the invention is not restricted for use on a fuel tank of a vehicle. It could be used on any container requiring a venting cap during normally upright orientation, a closed cap in an abnormally tipped orientation, and a cap which vents even in the abnormally tipped orientation in response to excessive internal pressure. Thus, the invention is not to be limited by the specific description above, but rather should be judged by the claims which follow.

I claim:

1. A ventable cover for a fluid container opening, comprising:
   (a) a cap having a lateral barrier wall with a substantially longitudinal vent bore therethrough;
   (b) a tiltable pin assembly extending through the bore and having an inboard portion extending below the barrier wall and an outboard portion extending above the barrier wall;
   (c) a ball positioned to roll in the cap above the barrier wall so as to impinge against the pin assembly outboard portion when the cap is not abnormally tipped;
   (d) bias means located below the barrier for resisting deflection of the pin assembly by the ball and for providing a resilient downward bias on the pin assembly;
   (e) a seal driven by the outboard portion of the pin assembly and being capable of sealing the bore when the ball is not impinging against the pin, and of allowing fluid to flow through the bore when the ball impinges against the pin assembly;
   (f) means over at least part of the barrier wall for causing the ball to tilt the pin assembly when the cover is horizontal;
   (g) means on a lower portion of the cover for attaching the cover to the fluid container; and
   (h) wherein the parts are juxtaposed such that when the ball is not impinging against the pin assembly the seal may nevertheless open under excess pressure conditions in the tank.

2. A cover as in claim 1, in which the seal comprises a resilient ring affixed around a part of the pin assembly and disposed to seal upon the barrier wall.

3. A cap as in claim 1, in which the bias means comprises a retainer affixed to the inboard portion of the pin assembly, and a helical spring encircling the inboard portion of the pin assembly and compressed between the retainer and an inboard side of the barrier wall.

4. A cover as in claim 1, in which the outboard portion of the pin assembly has a first enlarged head which contacts the ball when the longitudinal axis is vertical or is offset from vertical by a pre-selected angle or less.

5. A cover as in claim 4, in which the outboard portion of the pin assembly has a shoulder inboard of the head, the shoulder abutting against the seal.

* * * * *